US012719935B2

(12) United States Patent
Mihelich et al.

(10) Patent No.: US 12,719,935 B2
(45) **Date of Patent: *Aug. 25, 2026**

(54) SYSTEMS AND METHODS FOR EDGE PROCESSING USING SELECTIVELY SUSPENDED NETWORK SECURITY

(71) Applicant: Fortinet, Inc., Sunnyvale, CA (US)

(72) Inventors: Joseph R. Mihelich, Folsom, CA (US); Michael Xie, Sunnyvale, CA (US); Jordan Thompson, Burnaby (CA); Sandip Borle, Sunnyvale, CA (US); Sandeep Krishnamurthy, Sunnyvale, CA (US)

(73) Assignee: FORTINET, INC., Sunnyvale, CA (US)

(*) Notice: Subject to any disclaimer, the term of this patent is extended or adjusted under 35 U.S.C. 154(b) by 386 days.

This patent is subject to a terminal disclaimer.

(21) Appl. No.: 18/208,098

(22) Filed: Jun. 9, 2023

(65) Prior Publication Data

US 2024/0414210 A1 Dec. 12, 2024

(51) Int. Cl.
*H04L 9/40* (2022.01)

(52) U.S. Cl.
CPC ........ *H04L 63/205* (2013.01); *H04L 63/1425* (2013.01)

(58) Field of Classification Search
None
See application file for complete search history.

(56) References Cited

U.S. PATENT DOCUMENTS 7,360,090 B1 * 4/2008 Doskow ............... H04Q 3/0025 713/170
8,234,640 B1 * 7/2012 Fitzgerald ............... G06F 21/56 718/1

(Continued)

FOREIGN PATENT DOCUMENTS

CN 104704782 A 6/2015
WO WO-2014042914 A1 * 3/2014 ......... H04L 63/0245

OTHER PUBLICATIONS

Office Action for U.S. Appl. No. 18/208,110, mailed Nov. 26, 2024, 19 pages.

(Continued)

*Primary Examiner* — Teshome Hailu
*Assistant Examiner* — Mahabub S Ahmed
(74) *Attorney, Agent, or Firm* — Jaffery Watson Hamilton & DeSanctis LLP

(57) ABSTRACT

Various embodiments provide embodiments provide systems and methods for performing edge processing using selectively suspended network security processing. In one example, a non-edge device (e.g., a network security appliance) receives a first network traffic representing a first part of a network session from an edge device (e.g., a network router). The non-edge device applies at least one security process to the first network traffic to yield a security result. Based at least in part on the security result, (i) the non-edge device forward, the first network traffic to a destination and (ii) communicates an indication (e.g., a grant of suspended security review) to the edge device that the edge device is not required to transmit a second part of the network traffic session to the non-edge device for application of the at least one security process.

20 Claims, 8 Drawing Sheets

(56) References Cited

U.S. PATENT DOCUMENTS 8,239,918 B1* 8/2012 Cohen .................... G06F 21/12 726/1
8,331,404 B2* 12/2012 Law ........................ H04L 69/16 370/488
9,224,006 B1* 12/2015 Firestone ............ G06F 21/6227
11,675,503 B1* 6/2023 Ekins .................... G06F 3/0637 711/163
11,792,116 B1* 10/2023 Dickinson ........... H04L 41/0897 370/392
12,081,517 B2* 9/2024 Brecl .................. H04L 12/4633
2003/0188184 A1* 10/2003 Strongin ............. G06F 12/1491 726/30
2004/0111642 A1* 6/2004 Peles ................... H04L 63/0218 726/4
2004/0243847 A1* 12/2004 Way ...................... H04L 51/212 709/206
2006/0031325 A1* 2/2006 Cheng ................... H04L 51/212 709/206
2007/0204120 A1* 8/2007 Garimella ........... G06F 11/1458 714/E11.13
2011/0252456 A1* 10/2011 Hatakeyama ......... H04L 67/306 726/1
2011/0283359 A1* 11/2011 Prince ................ G06Q 30/0241 726/23
2012/0324533 A1* 12/2012 Conway .................. H04L 63/02 726/1
2014/0090055 A1* 3/2014 Palumbo ............... H04L 63/145 726/22
2014/0165130 A1* 6/2014 Zaitsev ................... G06F 21/00 726/1
2015/0020150 A1* 1/2015 Hagiuda ................. H04L 63/20 726/1
2015/0288718 A1* 10/2015 Pimenova ............. G06F 16/957 726/1
2016/0210166 A1* 7/2016 Cucinotta ............. G06F 9/4856
2016/0248682 A1* 8/2016 Lee ....................... H04L 67/146
2017/0099188 A1* 4/2017 Chang ..................... H04L 67/10
2017/0223058 A1* 8/2017 Barabash ............ H04L 63/1441
2017/0295205 A1* 10/2017 Kwon ..................... H04L 63/10
2017/0331739 A1* 11/2017 Sharma ............... H04L 45/7453
2018/0013651 A1* 1/2018 Lang ..................... H04L 69/324
2018/0191766 A1* 7/2018 Holeman ................ H04L 63/20
2018/0337887 A1* 11/2018 Aluvala .............. H04L 47/2433
2019/0124114 A1* 4/2019 Purushothaman .. H04L 63/1433
2020/0067970 A1* 2/2020 Compton ................ H04L 45/32
2020/0177634 A1* 6/2020 Hwang ............... H04L 63/1433
2020/0195668 A1* 6/2020 Eshet ...................... H04L 43/04
2020/0374215 A1* 11/2020 Shah ....................... H04L 45/22
2021/0006546 A1* 1/2021 Raza ......................... H04L 9/32
2021/0042679 A1* 2/2021 Kidd .................... G05B 19/406
2021/0044593 A1* 2/2021 Canada ............... H04L 63/1433
2021/0234860 A1* 7/2021 Bansal .................... H04L 67/51
2021/0385193 A1* 12/2021 Sayyed ................. H04L 63/101
2022/0053024 A1* 2/2022 Byron ................. H04L 63/1416
2022/0060888 A1* 2/2022 Li ......................... H04W 12/10
2022/0215111 A1* 7/2022 Ekins .................. G06F 21/6218
2022/0272110 A1* 8/2022 Agrawal ............. H04L 63/1425
2022/0337555 A1* 10/2022 Gol ..................... H04L 63/0236
2022/0368697 A1* 11/2022 Canada ............... H04L 63/1416
2023/0252147 A1* 8/2023 Gervais ................. G06F 21/566 726/23
2023/0403303 A1* 12/2023 Basu ..................... H04L 9/0833
2024/0137376 A1* 4/2024 Bogokovsky ......... G06F 21/554
2024/0137390 A1* 4/2024 Batson ................ G06F 16/9024
2024/0244036 A1* 7/2024 Kandasamy ........ H04L 63/0227
2024/0388605 A1* 11/2024 Swaminathan ......... H04L 51/48
2024/0414210 A1 12/2024 Mihelich
2024/0422179 A1* 12/2024 Metz ................... H04L 63/1425

OTHER PUBLICATIONS

Office Action for U.S. Appl. No. 18/208,110, mailed Mar. 20, 2025, 32 pages.

* cited by examiner

SYSTEMS AND METHODS FOR EDGE PROCESSING USING SELECTIVELY SUSPENDED NETWORK SECURITY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2023, Fortinet, Inc.

FIELD

Embodiments discussed generally relate to systems and methods for distributing network security, and more particularly to systems and methods for performing edge processing using selectively suspended network security processing.

BACKGROUND

Network security continues to migrate from centralized security solutions to edge security solutions. Migration to edge security solutions inherently involve a tradeoff between implementing costly processing power at the edge and increased throughput by avoiding relatively expensive wide area network (WAN) connections between the edge and a centralized security solution. Often the tradeoff results in sub-standard security that is unacceptable in most corporate networks where enterprise grade security is expected and relied upon.

Accordingly, there is a need in the art for advanced systems and methods for network security that is both effective and lower cost that existing solutions.

SUMMARY

Various embodiments provide systems and methods for performing edge processing using selectively suspended network security processing.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
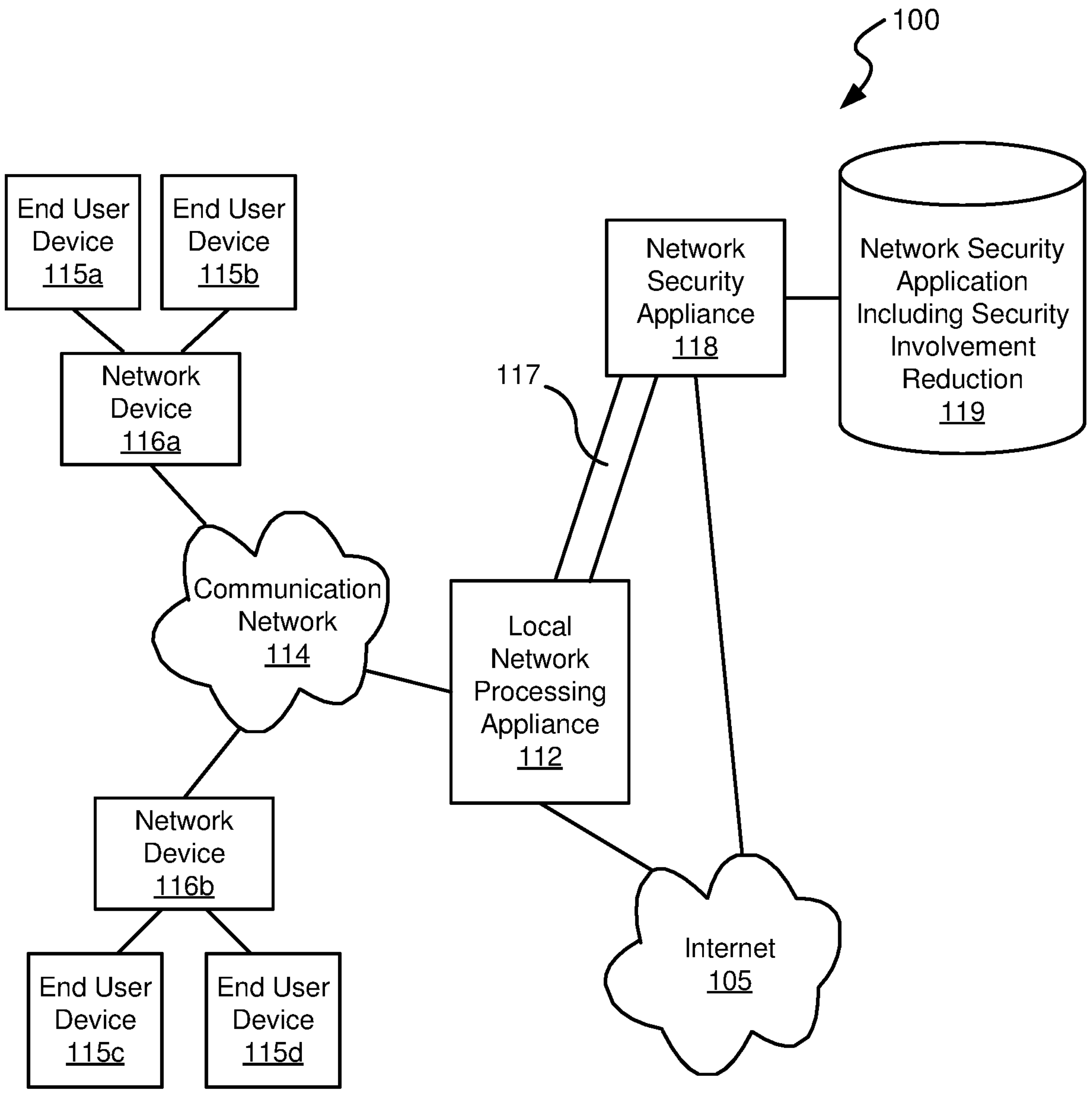
FIGS. 1A-1C illustrate a network architecture including a combination of a local network processing appliance and a network security appliance configured to enable edge processing based upon selectively suspended network security processing in accordance with some embodiments.

Various embodiments provide systems and methods for performing edge processing using selectively suspended network security processing.

In a typical enterprise network environment, edge devices forward network traffic to a central security system where processing power intensive security processing is applied before the network traffic is forwarded on to its designated destination. It has been found that such an approach uses considerable and costly WAN bandwidth between the network edge and the central security system. This scenario does not scale well as the inclusion of additional edge devices requires an ever increasing WAN bandwidth. Further, it has been determined that a significant portion of any network traffic session includes transitory traffic that is often of low security risk. Some embodiments provide systems and methods where a first subset of a network traffic session are communicated to a non-edge security processing device where intensive security processing is applied to the network traffic. Based at least in part on the processing of the first subset of the network traffic session, a network device nearer to the network edge than the non-edge security processing device is programmed to suspend security review by the non-edge security processing device for a second subset of the network traffic session.

Some embodiments are deployed in relation to a FortiSwitch™ which is configured to discover a FortiSASE™ and connect, providing remote management, local switch/route and secured WAN traffic. By doing this, zero touch (ZT) behaviors expected with FortiSwitch™ and FortiAP™ are made available with ZT discovery and configuration the complexity of end user configuration and management is eliminated.

A FortiSwitch™ connected to FortiSASE™ forms a FortiSwitch™ Island Root (FIR). The FIR acts as a local switch/router and secure WAN tunnel with FortiSASE™. Other ForitSwitch™ connecting to the FIR automatically form a larger FortiSwitch™ Island (FSI). FortiAP™/FortiFone™ which connect to the FSI and maintain their existing ZT behaviors. Eliminating the need for each Fortinet device to discover and tunnel traffic to directly to FortiSASE™.

Tunneling all WAN traffic presents a cost at scale problem. For some types of sessions, once authorized the bulk of the traffic is transitory and does not need further inspection. This leads to a waste of WAN bandwidth and higher cost. To address this, a FortiSwitch™ is configured in accordance with some embodiments discussed herein to perform a selective grant of suspended security review as more fully discussed below. Such a grant eliminates the need for some subset of network traffic to traverse the WAN.

In such embodiments deployed in relation to a FortiSwitch™, the FortiSwitch™ connects to a dispatch service. If the switch is to be managed by FortiSASE™ it will return the FortiSASE™ tunnel connection information. Upon receiving the dispatch result which indicates the switch is to be managed, the FortiSwitch™ initiates a IPSEC connection to FortiSASE™ with the secure connection information provided by the dispatch service.

A VXLAN tunnel is then established between the FortiSwitch™ and FortiSASE™. All further communication between the two falls under IPSEC encryption and VXLAN encapsulation. As with standard FortiLink™ over VXLAN all VLAN traffic is tunneled inside a single VXLAN VNI. FortiLink™ retains ownership of the untagged VLAN for FortiSwitch™ management (CAPWAP and REST API traffic). While all other VLANs are tunneled in VXLAN as VLAN tagged frames. Layer 2 connectivity is maintained between the devices connected to the FortiSwitch™ and with FortiSASE™. DHCP and all other services are available as with any FortiLink™ VXLAN connection to a FortiGate™.

A FortiSwitch™ connected to FortiSASE™ forms a FIR that acts as a local switch/router and secure WAN tunnel with FortiSASE™. Other FortiSwitch™ connecting to the FIR automatically form a larger FSI using the FortiLink™ auto-network process. An FSI is a L2 domain, when one or more FortiSwitch™ are connected together the auto-network process establishes an auto switch link (ISL [aka auto link aggregate]) between the 2 switch, utilizing as many cables as are connected. Additional configuration is automatically applied, such as necessary VLANs and DHCP/IGMP Snooping. Changes to the physical topology are automatically detected and the underling network configuration is adjusted.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a "network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "network edge" is used in its broadest sense to mean a location in a network where one or more user devices may be coupled to the network and/or where network traffic may be introduced or received in a communication network. The phrase "edge device", "edge processor", or "edge processing device" is used in its broadest sense to mean any device within a communication network that is closer to a network edge than a "non-edge device" or a "non-network edge device". Thus, the terms edge device and non-edge device are relative to each other with one being closer to the network edge than the other. As a particular example, a user device may be connected to a local network processing appliance, and the local network processing appliance relies on a network security appliance to perform network security processing for transmissions to/from the user device. In such an example, the network security appliance would be considered a non-edge device or a non-network edge device, and the local network processing appliance would be considered an edge device, an edge processor, or an edge processing device. This is because the local network processing appliance is relatively closer to the network edge where the user device attaches than the network security appliance.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for selectively excluding network traffic from security review. Such methods include: receiving, by a non-edge network device, a first network traffic from an edge network device, where the first network traffic is a first part of a network traffic session; applying, by the non-edge network device, at least one security process to the first network traffic to yield a security result; and based at least in part on the security result: forwarding, by the non-edge network device, the first network traffic to a destination; and communicating, by the non-edge network device, an indication that the edge network device is not required to transmit a second part of the network traffic session to the non-edge network device for application of the at least one security process.

In some instances of the aforementioned embodiments, the methods further include: applying, by the non-edge network device, network address translation to the first network traffic to yield the destination. In various instances of the aforementioned embodiments, the non-edge network device is a network security appliance and/or the edge network device is a network router. In some such instances, the first network traffic is provided from a user device coupled directly to the network router.

In various instances of the aforementioned embodiments, the indication that the edge network device is not required to transmit a second part of the network traffic session to the non-edge network device is a grant of suspended security review. In some such instances, communicating the grant of suspended security review includes communicating a termination point for the grant of suspended security review. In other such instances, the method further include: setting, by the non-edge network device, a termination point of the grant of suspended security review; and revoking, by the non-edge network device, the grant of suspended security review based at least in part on the termination point of the grant of suspended security review. In particular cases, the termination point is the end of the network traffic session. In other cases, the termination point is a defined number of bytes of the network traffic session.

Other embodiments provide network edge devices that include: a processing resource, and a non-transitory computer-readable medium. The non-transitory computer-readable medium is coupled to the processing resource, and has stored therein instructions that when executed by the processing resource cause the processing resource to: receive a first network traffic from an edge network device, where the first network traffic is a first part of a network traffic session; and apply at least one security process to the first network traffic to yield a security result; based at least in part on the security result: forward the first network traffic to a destination; and communicate an indication that the edge network device is not required to transmit a second part of the network traffic session to the non-edge network device for application of the at least one security process.

Yet other embodiments provide non-transitory computer-readable media that have stored therein instructions that when executed by a processing resource cause the processing resource to perform a method including: receiving a first network traffic from an edge network device, where the first network traffic is a first part of a network traffic session; applying at least one security process to the first network traffic to yield a security result; and based at least in part on the security result: forwarding the first network traffic to a destination; and communicating an indication that the edge network device is not required to transmit a second part of the network traffic session to a non-edge network device for application of the at least one security process.

Some embodiments provide methods for selecting network security processing at a network edge. The methods include: providing, by an edge network device, a first network traffic to a non-edge network device, where the first network traffic is a first part of a network traffic session; receiving, by the edge network device, a grant of suspended security review from the non-edge network device identifying the network traffic session; receiving, by the edge network device, a second network traffic, where the second network traffic is a second part of the network traffic session; and forwarding, by the edge network device, the second network traffic to a destination other than the non-edge network device without accessing the non-edge network device.

In some instances of the aforementioned embodiments, the methods further include applying, by the edge network device, network address translation to the second network traffic to yield the destination. In various instances of the aforementioned embodiments, the non-edge network device is a network security appliance. In some instances of the aforementioned embodiments, the edge network device is a network router. In some such instances, the first network traffic is provided from a user device coupled directly to the network router.

In various instances of the aforementioned embodiments, the grant of suspended security review from the non-edge network device indicates the network traffic session. In some such instances the methods further include: receiving, by the non-edge network device, a termination point for the grant of suspended security review; and revoking, by the non-edge network device, the grant of suspended security review based at least in part on the termination point. In some such instances, the termination point is the end of the network traffic session. In various such instances, the termination point is a defined number of bytes of the network traffic session.

Other embodiments provide edge network devices that include: a processing resource, and a non-transitory computer-readable medium. The non-transitory computer-readable medium is coupled to the processing resource, and has stored therein instructions that when executed by the processing resource cause the processing resource to: provide a first network traffic to a non-edge network device, where the first network traffic is a first part of a network traffic session; receive a grant of suspended security review from the non-edge network device identifying the network traffic session; receive a second network traffic, where the second network traffic is a second part of the network traffic session; and forward the second network traffic to a destination other than the non-edge network device without accessing the non-edge network device.

Yet other embodiments provide non-transitory computer-readable media having stored therein instructions that when executed by a processing resource cause the processing resource to perform a method including: providing a first network traffic to a non-edge network device, wherein the first network traffic is a first part of a network traffic session; receiving a grant of suspended security review from the non-edge network device identifying the network traffic session; receiving a second network traffic, where the second network traffic is a second part of the network traffic session; applying network address translation to the second network traffic to yield the destination; and forwarding the second network traffic to a destination other than the non-edge network device without accessing the non-edge network device.

Turning to FIG. 1A, network architecture 100 is shown including a combination of a local network processing appliance 112 and a network security appliance 118 configured to enable edge processing based upon selectively suspended network security processing in accordance with some embodiments. End user devices 115 (i.e., one of an end user device 115*a*, an end user device 115*b*, an end user device 115*c*, or an end user device 115*d*) are coupled to a communication network 114 via a respective network device 116 (i.e., one of a network device 116*a* or a network device 116*b*). Communication network 114 may be any type of communication network known in the art. Those skilled in the art will appreciate that, communication network 114 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

In network architecture 100 and considering network device 116 and local network processing appliance 112, network device 116 would be considered an edge device and local network processing appliance 112 would be considered a non-edge device because network device 116 is closer to the network edge than local network processing appliance 112. Similarly, considering local network processing appliance 112 and network security appliance 118, local network processing appliance 112 would be considered an edge device and network security appliance 118 would be considered a non-edge device because local network processing appliance 112 is closer to the network edge than network security appliance 118.

In terms of applying network security, local network processing appliance 112 is a relatively unintelligent device when compared with network security appliance 118. Network security appliance 118 may implement sophisticated network security processing that is beyond the capability of local network processing appliance 112. In a standard operation, network traffic originating from an end user device 115 passing through local network processing appliance 112 is provided to network security appliance 118 via a WAN (e.g., communication network 114). Network security appliance 118 executes a network security application 119 causing it to apply network security processes to the network traffic and based upon the results and to forward the network traffic to an identified destination of the network traffic. Such network security processes may be any network security processes known in the art including, but not limited to, firewall processes. Based upon the disclosure provided herein, one of ordinary skill in the art will recognize a variety of network security processes that may be applied to received network traffic in accordance with different embodiments.

Network security application 119 includes various security involvement reduction processes. Such security involvement reduction processes cause network security appliance 118 to selectively grant a security review suspension to local network security appliance 118. Once such a security review suspension is granted by network security appliance 118, local network security appliance 118 does not forward network traffic to network security appliance 118 for security review subject to the limitation of the grant. Such forwarding may be, for example, to some destination on the Internet 105. In some embodiments, network traffic that are subject to a granted security review suspension are reviewed for security purposes using rudimentary security processing implemented at local network processing appliance 112 before being forwarded to an identified destination of the network traffic. In other embodiments, network traffic that are subject to a granted security review suspension are not reviewed for security purposes before being forwarded to an identified destination of the network traffic.

Figure 1B:
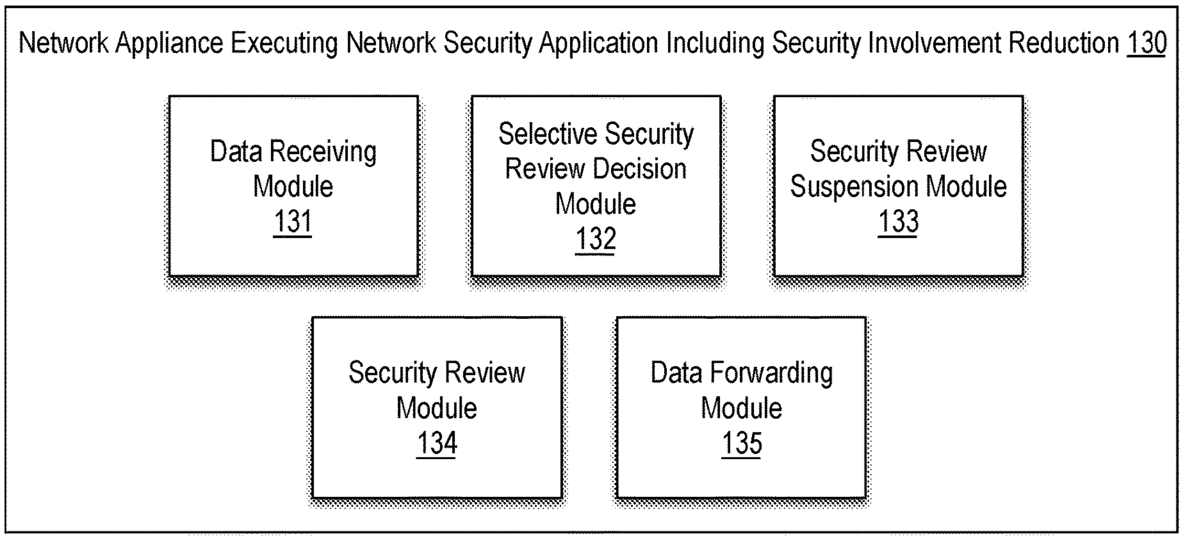

Turning to FIG. 1B, an example implementation of a network appliance executing a network security application including security involvement reduction 130 (e.g., network security appliance 118 executing network security application including security involvement reduction 119) is shown in accordance with some embodiments. As shown in this example, network appliance executing a network security application including security involvement reduction 130 includes: a data receiving module 131, a selective security review decision module 132, a security review suspension module 133, a security review module 134, and a data forwarding module 135.

Data receiving module 131 is configured to receive data transmissions from an edge device and to perform network address translation on the received data. Selective security review decision module 132 is configured to determine whether security processing is to be applied to a received data transmission or if security processing has been suspended for the received data transmission. Various processes are applied to determine whether an edge device is more likely or less likely to be involved in malicious behaviors. Where a received data transmission is received from an edge device that is less likely to be involved in malicious behaviors, the data transmission may be identified as not requiring security review. In contrast, a data transmission from an edge device that has not been identified as posing a low probability of malicious behavior may be subject to security processing.

Security review suspension module 133 is configured to determine whether data transmissions from a particular edge device should be subject to security review, or whether such security review may be suspended for the edge device. Such security review suspension determination may be made similar to that discussed below in relation to FIG. 3B.

Security review module 134 is configured to apply security processing a data transmission received from the edge device. Based upon the security processing, the data transmission is identified as allowable or rejected. Data forwarding module 135 is configured to forward a received data transmission to a destination address where either the data transmission has successfully passed security processing or security processing was identified as suspended for the data transmission.

Figure 1C:
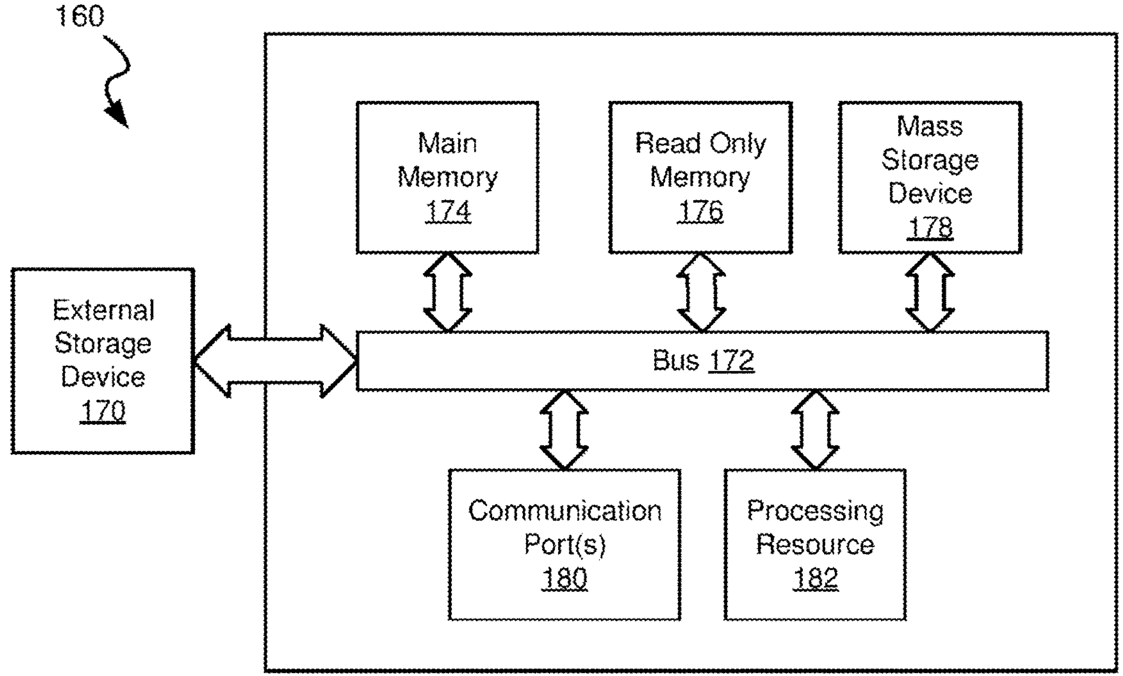

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
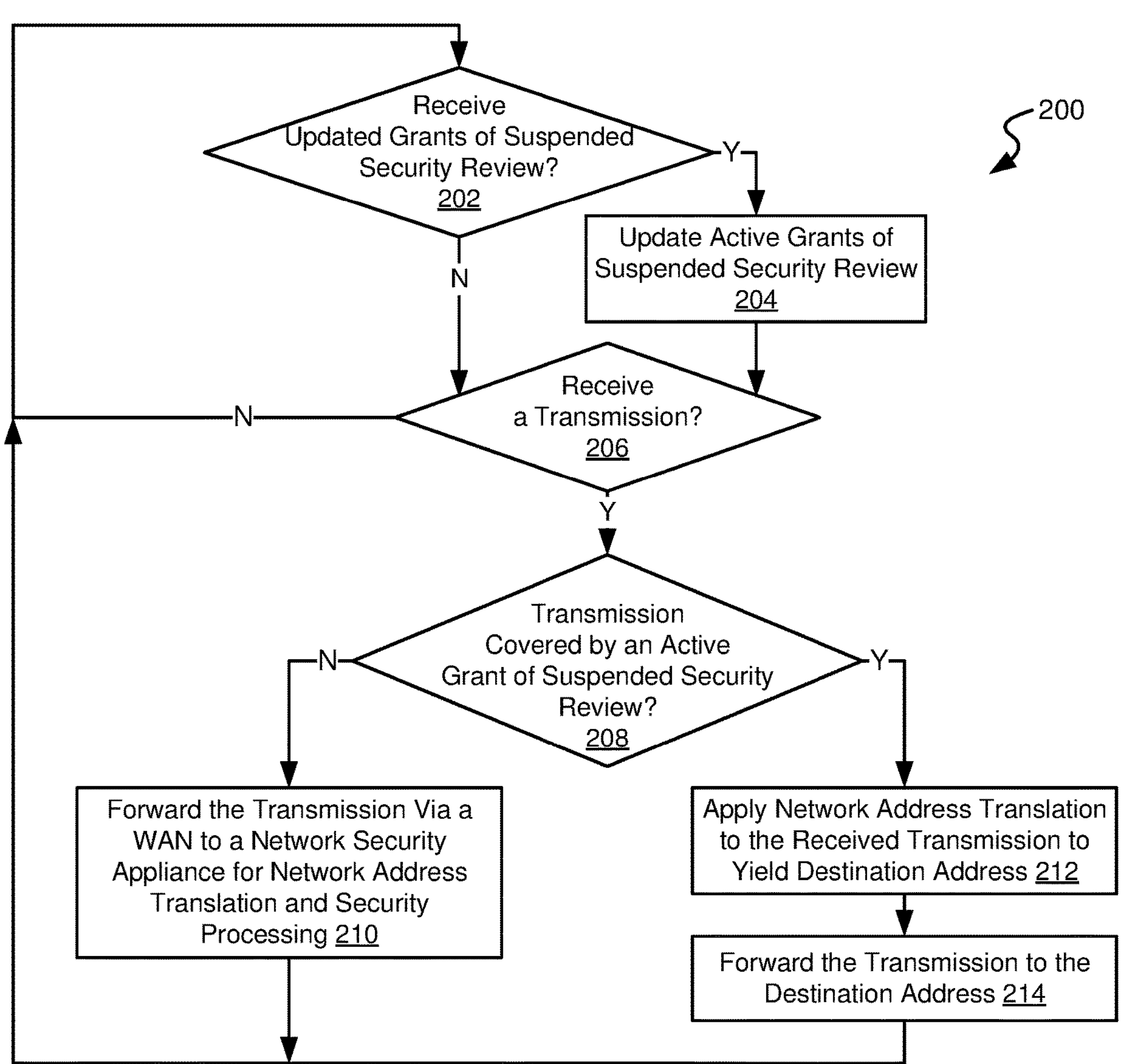
FIG. 2 is a flow diagram showing a method in accordance with some embodiments for edge processing relying upon grants of suspended security review from a non-edge security processing system.

Turning to FIG. 2, a flow diagram 200 shows a method in accordance with some embodiments for edge processing relying upon grants of suspended security review from a non-edge security processing system. Following flow diagram 200, it is determined whether any changes to grants of suspended security review has been received from a non-edge device (block 202). Such changes to grants of suspended security review may include, but are not limited to, a new grant for suspended security review specific to a particular network traffic session traversing a given network edge, or a revocation of a prior grant of suspended security review specific to a particular network traffic session traversing a given network edge. Where a change to any grant of suspended security review has been received (block 202), a memory including active grants of suspended security review is updated (block 204). Such an update removes grants that have been revoked and adds new grants from a list of active grants of suspended security review.

It is determined whether a transmission (i.e., network traffic) has been received (block 206). Where network traffic has been received (block 206), it is determined whether the network traffic is covered by an active grant of suspended security review (block 208). In some embodiments, a grant of suspended security review is given for network traffic that has been identified as having a lower potential of maliciousness. An active grant of suspended security review may, but is not limited to, network traffic associated with a defined network traffic session, or more globally to network traffic from a defined source and/or directed to a defined destination. Thus, where for example an active grant of suspended security review is for network traffic associated with a defined network traffic session, any received network traffic for the defined network traffic session is considered covered by the active grant of suspended security review. Based upon the disclosure provided herein, one of ordinary skill in the art will recognize a variety of grants of suspended security review that may be used in relation to different embodiments and corresponding network traffic that would be covered by such grants of suspended security review.

Where the received network traffic is not covered by an active grant of suspended security review (block 208), the network traffic is forwarded to a non-edge device via a WAN (block 210). The non-edge device applies standard network security processing and network address translation, and where appropriate forwards the network traffic to a destination address for the network traffic.

Alternatively, where the received network traffic is covered by an active grant of suspended security review (block 208), a network address translation is applied to yield the destination address of the network traffic (block 212) and the network traffic is routed directly to the destination address without application of network security processing by the non-edge device (block 214).

In the method of FIG. 2, an edge device is able to forward network traffic that has been identified as having a lower potential of maliciousness without extensive network security processing, while at the same time requiring extensive network security processing for network traffic that has not been designated as having a lower potential of maliciousness. Furthermore, in the embodiment discussed in FIG. 2, the edge device may only be required to determine whether network traffic is covered by an active grant of suspended security review (e.g., is the network traffic from a designated network traffic session) and upon making such a determination to resolve an address and forward the network traffic to a defined destination. The processing power of the edge device does not need to be significantly increased as it is not taking on the responsibility for network security processing. Furthermore, such an approach avoids use of the WAN for transmissions that are less likely to require substantial network security processing.

Figure 3A:
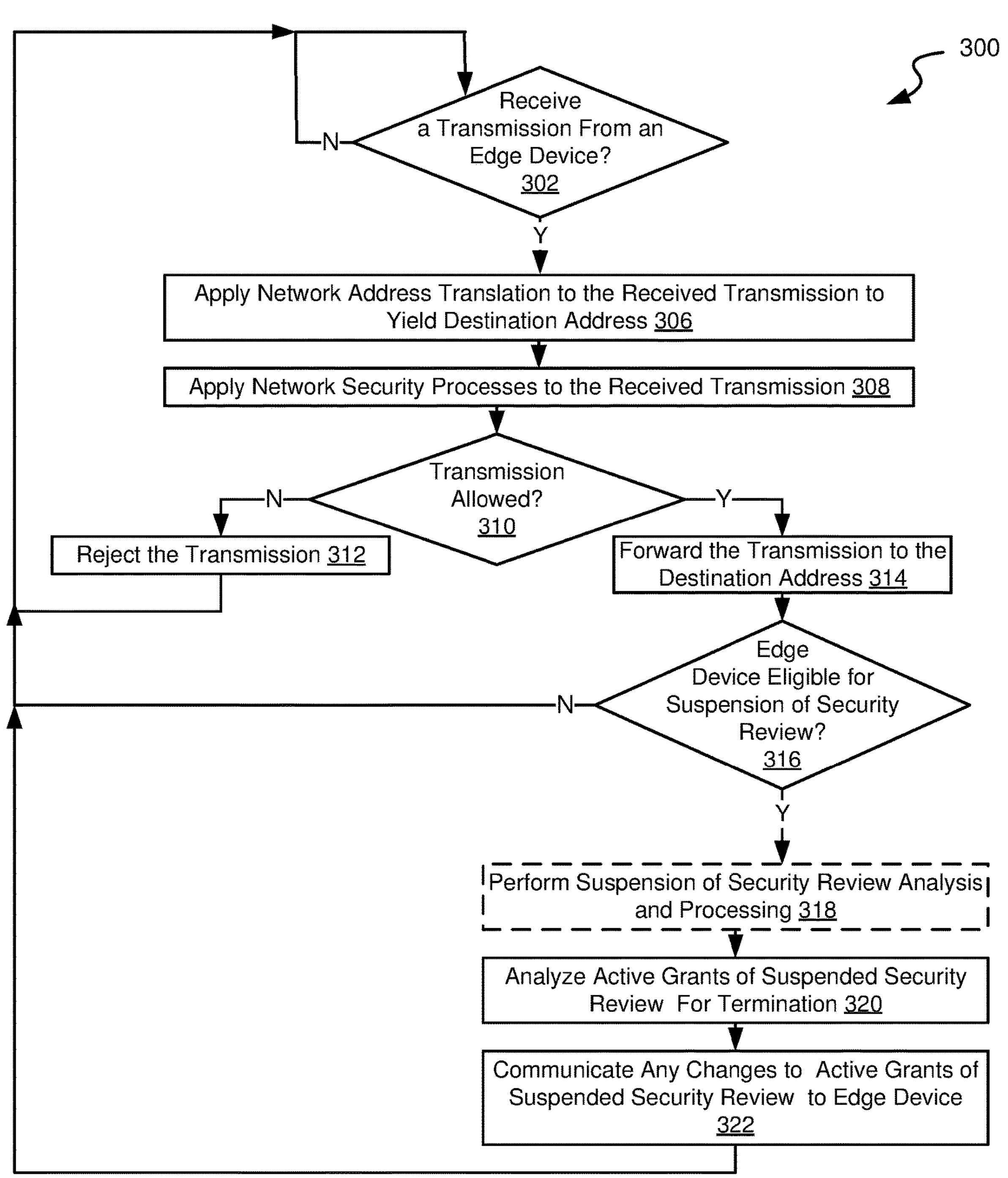
FIGS. 3A-3B are flow diagrams showing a method for non-edge security processing including granting suspended security review for an edge device in accordance with various embodiments.
Figure 3B:
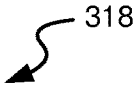
Figure 3B:
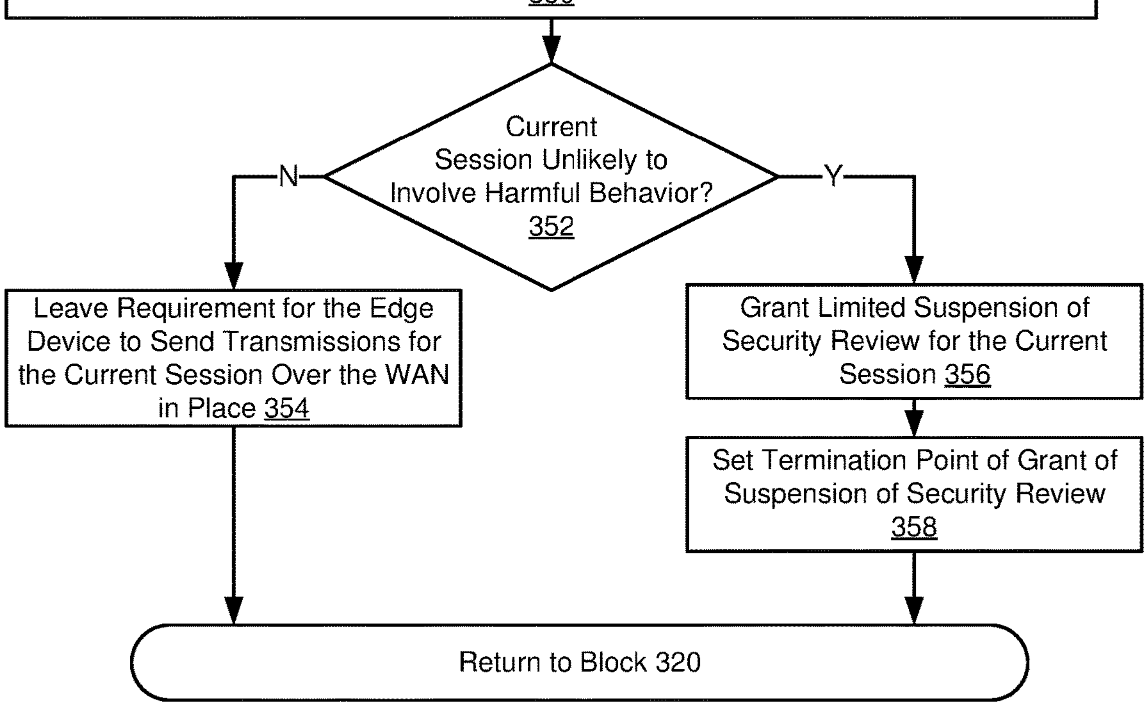

Turning to FIGS. 3A-3B, flow diagrams 300, 318 show a method for non-edge security processing including granting suspended security review for an edge device in accordance with various embodiments. Following flow diagram 300 of FIG. 3A, it is determined whether a transmission (i.e., network traffic) is received from an edge device (block 302). Data is received from an edge device for application of security processes, network address translation, and forwarding to a destination.

Where network traffic is received (block 302), network address translation is applied to the received network traffic to determine a destination of the network traffic (block 306). In some embodiments, network address translation is applied only once per network traffic session and as such network traffic received later in a network traffic session may simply use a previously resolved address. Various network security processes are applied to the network traffic (block 308). Any network security processes known in the art may be applied. As just some examples, network security processes associated with a network firewall may be applied. Based upon the disclosure provided herein, one of ordinary skill in the art will recognize a variety of network security processes that may be applied in accordance with different embodiments.

Based upon the output of the network security processes it is determined whether the network traffic is allowed (block 310). Thus, for example, where application of the network security processes reveal that the network traffic is malicious, the network traffic may not be allowed. Alternatively, where application of the network security processes do not reveal any maliciousness, the network traffic may be allowed. Where it is determined that the network traffic is not allowed (block 310), the network traffic is rejected and not forwarded to its define destination (block 312).

Alternatively, where it is determined that the network traffic is allowed (block 310), the network traffic is forwarded to the identified destination address (block 314). It is then determined whether the edge device traversed by the network traffic is eligible for suspension of security review (block 316). In some embodiments, only edge devices that are configured to allow selective security review similar to that discussed in the method of FIG. 2 are eligible for suspension of security review. In various embodiments, all edge devices are assumed eligible for suspension of security review. In yet other embodiments, only edge devices that are specifically identified by a human operator are eligible for suspension of security review. Based upon the disclosure provided herein, one of ordinary skill in the art will recognize a variety of combinations of edge devices in a given network that may be designated as eligible and ineligible in accordance with different embodiments.

Where it is determined that the edge device is eligible for suspension of security review (block 316), suspension of security review analysis and processing is performed (block 318). Block 318 is shown in dashed lines as it represents the processes discussed in flow diagram 318 of FIG. 3B.

Turning to FIG. 3B and following flow diagram 318, the received network traffic is processed in light of: (1) confidence rules for suspending review of transmissions, (2), source and destination addresses of the current network traffic session, (3) prior transmissions in the current network traffic session, and/or (4) historical information about the source and destination (block 350). This processing operates to yield a likelihood of future harmful behavior in the network traffic session corresponding to the network traffic. As an example, the confidence rules may require network security processing for only a first subset of a network traffic session and no processing for bulk data included in a second subset of the network traffic session. In such a case, prior transmissions in the network traffic session may be used to determine if processing of the first subset of the network traffic session is complete and all that remains is the second subset of the network traffic session. As another example, the confidence rules may indicate that network security processing is not necessary for network traffic sessions involving a particular source and/or a particular destination. In such a case, the source and/or the destination addresses of the current network traffic session are considered. As yet another example, the confidence rules may indicate that network security processing is not necessary for network traffic sessions involving a particular source and/or a particular destination unless historical instances of maliciousness are identified in one or more of the identified source or destination. In such a case, the source and/or the destination addresses of the current network traffic session and the historical information about the source and/or the destination are considered. Based upon the disclosure provided herein, one of ordinary skill in the art will recognize a variety of information and/or combinations of information that may be considered in making a determination about whether network security processing can be suspended for various network traffic.

Based upon the determined likelihood of future harmful behavior in a network traffic session (block 350), it is determined whether the current network traffic session is unlikely to involve future harmful behavior (block 352). In some embodiments, this is determined by comparing the determined likelihood of future harmful behavior with a threshold value. In some such embodiments, the threshold value is user programmable. Where it is determined that the current network traffic session is not unlikely to involve future harmful behavior (block 352), no change is made and the requirement for the edge device to send network traffic over the WAN that corresponds to the network traffic session remains in place (block 354). At this juncture, the process returns to block 320 of FIG. 3A.

Alternatively, where it is determined that the current network traffic session is unlikely to involve future harmful behavior (block 352), a limited suspension of security review is granted for the current network traffic session (block 356). In some embodiments, such a grant includes updating a memory including active grants of suspended security review.

In addition, a termination point of the granted suspension of security review is set (block 358). This involves identifying a point in the future where the grant will expire and thereby be revoked. In some embodiments, a grant lasts until the end of the particular network traffic session. In such a case, the grant is revoked once the network traffic session completes and is closed. In other embodiments, a grant lasts until either then end of the network traffic session or for a defined number of bytes transferred, whichever comes first. Based upon the disclosure provided herein, one of ordinary skill in the art will recognize a variety of termination points of a granted suspension of security review that may be used in relation to different embodiments. At this juncture, the process returns to block 320 of FIG. 3A.

Returning to FIG. 3A, active grants of suspended security review are analyzed to determine whether they have expired and need to be revoked (block 320). Any revocations result in a corresponding active grant of suspended security review being removed from memory. Further, any changes (both revocations and additions) to the grants of suspended security review are communicated to the edge device traversed by the current network traffic suspension (block 322). The communication indicates any grants that have been revoked and any grants that have been added. A grant that has been added will cause the edge device to route network traffic covered by the grant directly without referral to the non-edge device for network security processing. Once the changes to the grants are communicated to the edge device, the edge device operates to update its internal list of active grants of suspended security review as discussed above in relation to blocks 202-204 of FIG. 2.

Figure 4:
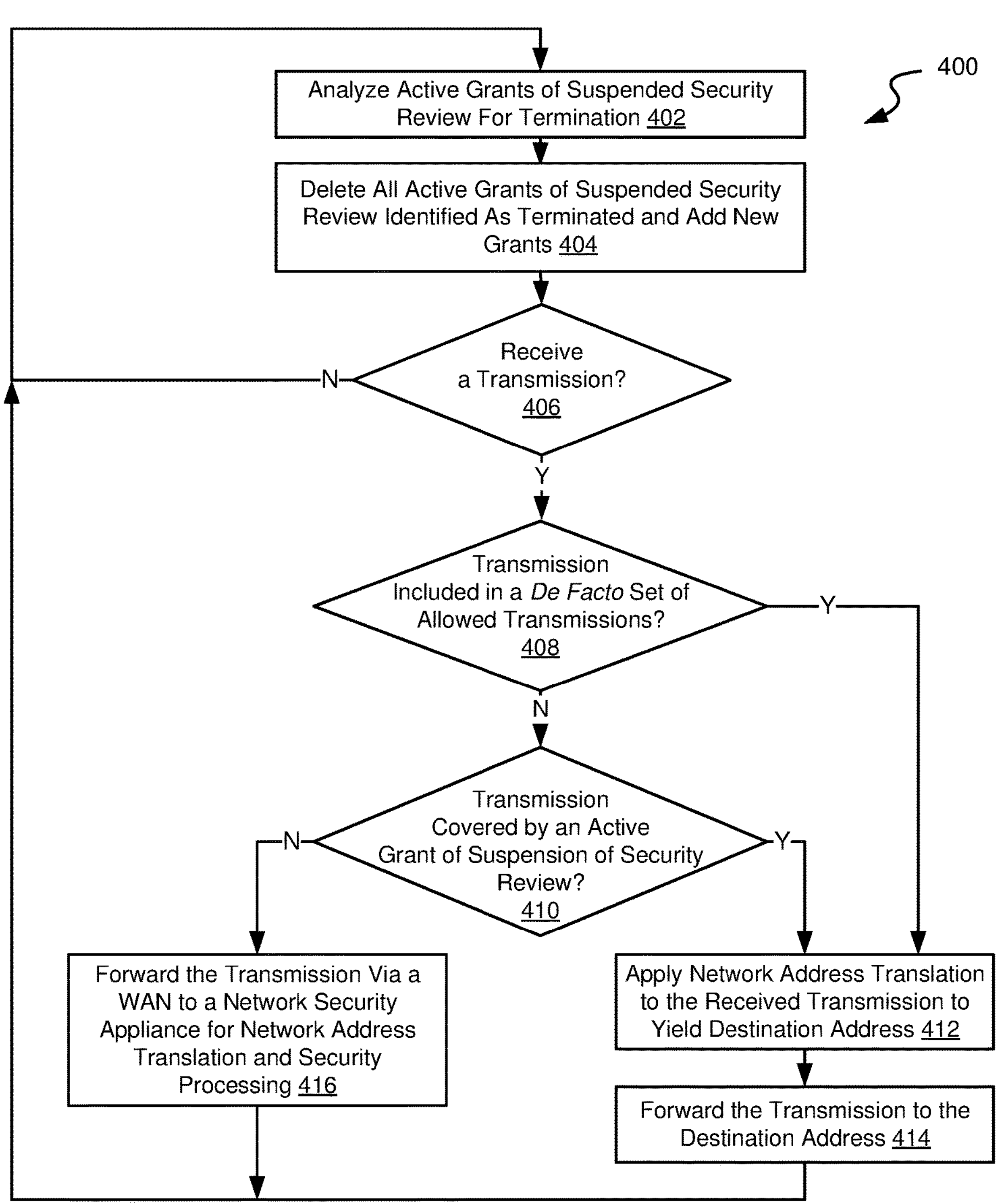
FIG. 4 is a flow diagram showing a method in accordance with some embodiments for edge processing using an edge device capable of making autonomous decisions on security implementation and continuance of a grant of suspended security review from a non-edge security processing system.

Turning to FIG. 4, a flow diagram 400 shows a method in accordance with some embodiments for edge processing relying upon grants of suspended security review from a non-edge security processing system. This method is implemented in an edge device that is capable of making some level of autonomous security decisions and revoking previous grants of suspended security review. Following flow diagram 400, active grants of suspended security review are analyzed to determine whether they have expired and need to be revoked (block 402). This analysis is based upon a termination point set by a non-edge device as more fully described below in relation to blocks 520 of FIG. 5A and block 558 of FIG. 5B. Any active grants of suspended security review that have been identified as expired (block 402) are deleted from a memory that maintains a list of active grants of suspended security review (block 404). In addition, any newly added grants of suspended security review (i.e., those communicated as discussed in relation to block 520 of FIG. 5A) are added to the list of active grants of suspended security review (block 404).

It is determined whether a transmission (i.e., network traffic) has been received (block 406). Where network traffic has been received (block 406), it is determined whether it is covered by a de facto set of allowed network traffic (block 408). Such de facto sets of allowed network traffic may be programmed by a human operator into the edge device and are rules indicating network traffic that will never be forwarded to a non-edge device for network security processing. As an example, any network traffic between a first defined source/destination and a second defined source/destination may be identified as a de facto set of allowed network traffic. Based upon the disclosure provided herein, one of ordinary skill in the art will recognize other network traffic that may be covered in a de facto set of allowed network traffic in accordance with different embodiments.

Where the network traffic is covered by a de facto set of allowed network traffic (block 408), a network address translation is applied to yield the destination address of the network traffic (block 412) and the network traffic is routed directly to the destination address without application of network security processing by the non-edge device (block 414).

Alternatively, where the network traffic is covered by a de facto set of allowed network traffic (block 408), it is determined whether the network traffic is covered by an active grant of suspended security review (block 410). In some embodiments, a grant of suspended security review is given for network traffic that has been identified as having a lower potential of maliciousness. An active grant of suspended security review may, but is not limited to, network traffic associated with a defined network traffic session, or more globally to network traffic from a defined source and/or directed to a defined destination. Thus, where for example an active grant of suspended security review is for network traffic associated with a defined network traffic session, any received network traffic for the defined network traffic session is considered covered by the active grant of suspended security review. Based upon the disclosure provided herein, one of ordinary skill in the art will recognize a variety of grants of suspended security review that may be used in relation to different embodiments and corresponding network traffic that would be covered by such grants of suspended security review.

Where the received network traffic is not covered by an active grant of suspended security review (block 408), the network traffic is forwarded to a non-edge device via a WAN (block 416). The non-edge device applies standard network security processing and network address translation, and where appropriate forwards the network traffic to a destination address for the network traffic.

Alternatively, where the received network traffic is covered by an active grant of suspended security review (block 410), a network address translation is applied to yield the destination address of the network traffic (block 412) and the network traffic is routed directly to the destination address without application of network security processing by the non-edge device (block 414).

Similar to the method discussed above in relation to FIG. 2, in the method of FIG. 4 an edge device is able to forward network traffic that has been identified as having a lower potential of maliciousness without extensive network security processing, while at the same time requiring extensive network security processing for network traffic that has not been designated as having a lower potential of maliciousness. Furthermore, in the embodiment discussed in FIG. 4, the edge device may only be required to determine whether network traffic is covered by an active grant of suspended security review (e.g., is the network traffic from a designated network traffic session) and upon making such a determination to resolve an address and forward the network traffic to a defined destination. The processing power of the edge device does not need to be significantly increased as it is not taking on the responsibility for network security processing. Furthermore, such an approach avoids use of the WAN for transmissions that are less likely to require substantial network security processing.

Figure 5A:
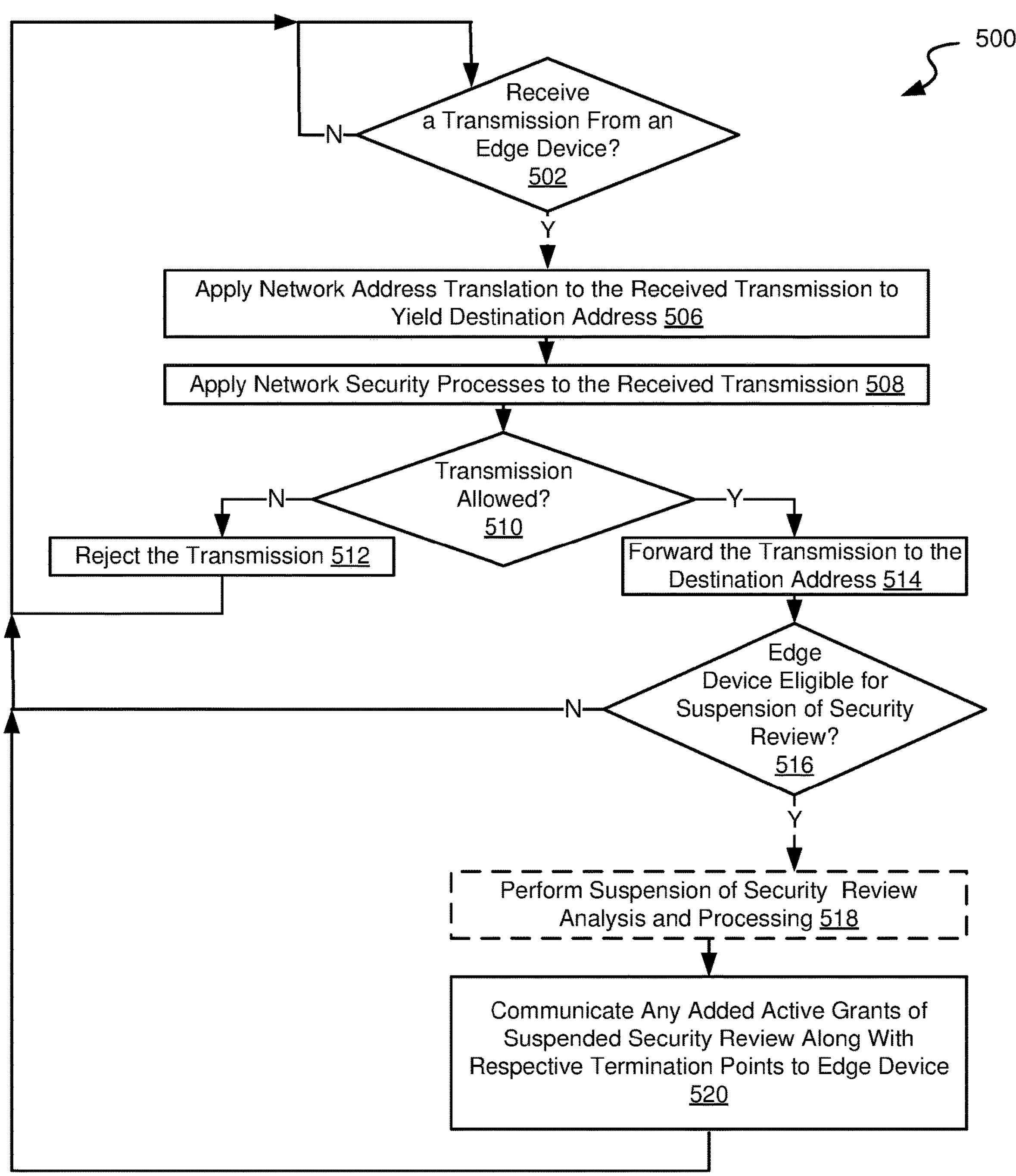
FIGS. 5A-5B are flow diagrams showing a method for non-edge security processing capable of supporting an edge device capable of making autonomous decisions on security implementation and continuance of a grant of suspended security review from a non-edge security processing system in accordance with some embodiments.
Figure 5B:
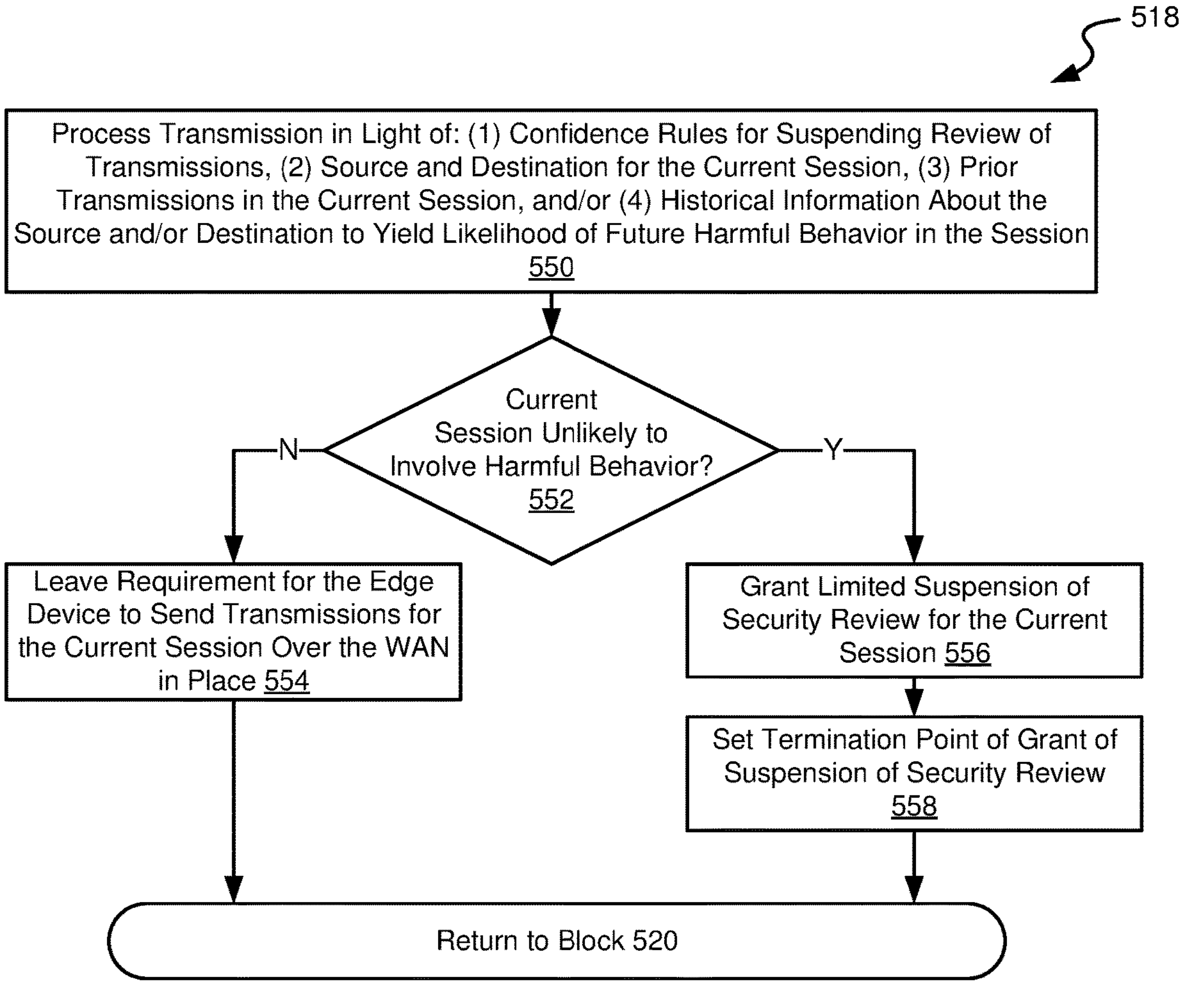

Turning to FIGS. 5A-5B, flow diagrams 500, 518 show a method for non-edge security processing capable of supporting an edge device capable of making autonomous decisions on security implementation and continuance of a grant of suspended security review from a non-edge security processing system in accordance with some embodiments. Following flow diagram 500 of FIG. 5A, it is determined whether a transmission (i.e., network traffic) is received from an edge device (block 502). Data is received from an edge device for application of security processes, network address translation, and forwarding to a destination.

Where network traffic is received (block 502), network address translation is applied to the received network traffic to determine a destination of the network traffic (block 506). In some embodiments, network address translation is applied only once per network traffic session and as such network traffic received later in a network traffic session may simply use a previously resolved address. Various network security processes are applied to the network traffic (block 508). Any network security processes known in the art may be applied. As just some examples, network security processes associated with a network firewall may be applied. Based upon the disclosure provided herein, one of ordinary skill in the art will recognize a variety of network security processes that may be applied in accordance with different embodiments.

Based upon the output of the network security processes it is determined whether the network traffic is allowed (block 510). Thus, for example, where application of the network security processes reveal that the network traffic is malicious, the network traffic may not be allowed. Alternatively, where application of the network security processes do not reveal any maliciousness, the network traffic may be allowed. Where it is determined that the network traffic is not allowed (block 510), the network traffic is rejected and not forwarded to its define destination (block 512).

Alternatively, where it is determined that the network traffic is allowed (block 510), the network traffic is forwarded to the identified destination address (block 514). It is then determined whether the edge device traversed by the network traffic is eligible for suspension of security review (block 516). In some embodiments, only edge devices that are configured to allow selective security review similar to that discussed in the method of FIG. 2 are eligible for suspension of security review. In various embodiments, all edge devices are assumed eligible for suspension of security review. In yet other embodiments, only edge devices that are specifically identified by a human operator are eligible for suspension of security review. Based upon the disclosure provided herein, one of ordinary skill in the art will recognize a variety of combinations of edge devices in a given network that may be designated as eligible and ineligible in accordance with different embodiments.

Where it is determined that the edge device is eligible for suspension of security review (block 516), suspension of security review analysis and processing is performed (block 518). Block 518 is shown in dashed lines as it represents the processes discussed in flow diagram 518 of FIG. 5B.

Turning to FIG. 5B and following flow diagram 518, the received network traffic is processed in light of: (1) confidence rules for suspending review of transmissions, (2), source and destination addresses of the current network traffic session, (3) prior transmissions in the current network traffic session, and/or (4) historical information about the source and destination (block 550). This processing operates to yield a likelihood of future harmful behavior in the network traffic session corresponding to the network traffic. As an example, the confidence rules may require network security processing for only a first subset of a network traffic session and no processing for bulk data included in a second subset of the network traffic session. In such a case, prior transmissions in the network traffic session may be used to determine if processing of the first subset of the network traffic session is complete and all that remains is the second subset of the network traffic session. As another example, the confidence rules may indicate that network security processing is not necessary for network traffic sessions involving a particular source and/or a particular destination. In such a case, the source and/or the destination addresses of the current network traffic session are considered. As yet another example, the confidence rules may indicate that network security processing is not necessary for network traffic sessions involving a particular source and/or a particular destination unless historical instances of maliciousness are identified in one or more of the identified source or destination. In such a case, the source and/or the destination addresses of the current network traffic session and the historical information about the source and/or the destination are considered. Based upon the disclosure provided herein, one of ordinary skill in the art will recognize a variety of information and/or combinations of information that may be considered in making a determination about whether network security processing can be suspended for various network traffic.

Based upon the determined likelihood of future harmful behavior in a network traffic session (block 550), it is determined whether the current network traffic session is unlikely to involve future harmful behavior (block 552). In some embodiments, this is determined by comparing the determined likelihood of future harmful behavior with a threshold value. In some such embodiments, the threshold value is user programmable. Where it is determined that the current network traffic session is not unlikely to involve future harmful behavior (block 552), no change is made and the requirement for the edge device to send network traffic over the WAN that corresponds to the network traffic session remains in place (block 554). At this juncture, the process returns to block 520 of FIG. 5A.

Alternatively, where it is determined that the current network traffic session is unlikely to involve future harmful behavior (block 552), a limited suspension of security review is granted for the current network traffic session (block 556). In some embodiments, such a grant includes updating a memory including active grants of suspended security review.

In addition, a termination point of the granted suspension of security review is set (block 558). This involves identifying a point in the future where the grant will expire and thereby be revoked. In some embodiments, a grant lasts until the end of the particular network traffic session. In such a case, the grant is revoked once the network traffic session completes and is closed. In other embodiments, a grant lasts until either then end of the network traffic session or for a defined number of bytes transferred, whichever comes first. Based upon the disclosure provided herein, one of ordinary skill in the art will recognize a variety of termination points of a granted suspension of security review that may be used in relation to different embodiments. At this juncture, the process returns to block 520 of FIG. 5A.

Returning to FIG. 5A, any added grants of suspended security review are communicated to the edge device traversed by the current network traffic suspension (block 520). This communication includes termination points for respective added grants of suspended security review. The receiving edge device is responsible for revoking outdated grants of suspended security review and for updating its list to include any active grants of suspended security review as discussed above in relation to blocks 402-404 of FIG. 4.

In conclusion, the present disclosure provides for novel systems, devices, and methods. While detailed descriptions of one or more embodiments have been given above, various alternatives, modifications, and equivalents will be apparent to those skilled in the art without varying from the spirit of the claims. Therefore, the above description should not be taken as limiting the scope of the inventions, which are defined by the appended claims.

What is claimed is:

1. A method comprising:

receiving, by a non-edge device, a first network traffic from an edge device, wherein the first network traffic is a first part of a network traffic session, wherein the edge device is closer to a location in a network where network traffic is introduced into the network than the non-edge device, and wherein a default operating mode of the edge device involves the edge device sending all network traffic traversing the edge device to the non-edge device for application of at least one security process to the network traffic;

applying, by the non-edge device, the at least one security process to the first network traffic to yield a security result; and based at least in part on the security result, forwarding, by the non-edge device, the first network traffic to a destination;

performing, by the non-edge device, a suspension of security review analysis on the network traffic session to yield a likelihood of the network traffic session involving future harmful behavior; and facilitate efficient processing of the network traffic session by selectively excluding at least a portion of the network traffic session from security review by the non-edge device by:

based on the likelihood of the network traffic session involving future harmful behavior being greater than or equal to a predetermined or configurable threshold, leaving the default operating mode in place; and based on the likelihood of the network traffic session involving future harmful behavior being below a predetermined or configurable threshold, overriding the default operating mode by communicating, by the non-edge device, an indication to the edge device that the edge device is not required to transmit a second part of the network traffic session to the non-edge device for application of the at least one security process.

2. The method of claim 1, the method further comprising: applying, by the non-edge device, network address translation to the first network traffic to yield the destination.

3. The method of claim 1, wherein the non-edge device is a network security appliance.

4. The method of claim 1, wherein the edge device is a network router.

5. The method of claim 4, wherein the first network traffic is provided from a user device coupled directly to the network router.

6. The method of claim 1, wherein the indication that the edge device is not required to transmit a second part of the network traffic session to the non-edge device is a grant of suspended security review, and wherein communicating the grant of suspended security review includes communicating a termination point for the grant of suspended security review.

7. The method of claim 6, wherein the termination point is an end of the network traffic session.

8. The method of claim 6, wherein the termination point is a defined number of bytes of the network traffic session.

9. The method of claim 1, wherein the indication that the edge device is not required to transmit a second part of the network traffic session to the non-edge device is a grant of suspended security review, the method further comprising:

setting, by the non-edge device, a termination point of the grant of suspended security review; and revoking, by the non-edge device, the grant of suspended security review based at least in part on the termination point of the grant of suspended security review.

10. A non-edge device comprising:

a processing resource;

a non-transitory computer-readable medium, coupled to the processing resource, and having stored therein instructions that when executed by the processing resource cause the processing resource to:

receive a first network traffic from an edge device, wherein the first network traffic is a first part of a network traffic session, wherein the edge device is closer to a location in a network where network traffic is introduced into the network than the non-edge device, and wherein a default operating mode of the edge device involves the edge device sending all network traffic traversing the edge device to the non-edge device for application of at least one security process to the network traffic;

apply the at least one security process to the first network traffic to yield a security result; and based at least in part on the security result, forward the first network traffic to a destination;

perform a suspension of security review analysis on the network traffic session to yield a likelihood of the network traffic session involving future harmful behavior; and facilitate efficient processing of the network traffic session by selectively excluding at least a portion of the network traffic session from security review by the non-edge device by:

based on the likelihood of the network traffic session involving future harmful behavior being greater than or equal to a predetermined or configurable threshold, leaving the default operating mode in place; and based on the likelihood of the network traffic session involving future harmful behavior being below a predetermined or configurable threshold, overriding the default operating mode by communicating an indication to the edge device that the edge device is not required to transmit a second part of the network traffic session to the non-edge device for application of the at least one security process.

11. The non-edge device of claim 10, wherein the non-transitory computer-readable medium further includes therein instructions that when executed by the processing resource cause the processing resource to apply network address translation to the first network traffic to yield the destination.

12. The non-edge device of claim 10, wherein the non-edge device is a network security appliance.

13. The non-edge device of claim 10, wherein the edge device is a network router.

14. The non-edge device of claim 13, wherein the first network traffic is provided from a user device coupled directly to the network router.

15. The non-edge device of claim 10, wherein the indication that the edge device is not required to transmit a second part of the network traffic session to the non-edge device is a grant of suspended security review, and wherein communicating the grant of suspended security review includes communicating a termination point for the grant of suspended security review.

16. The non-edge device of claim 10, wherein the indication that the edge device is not required to transmit a second part of the network traffic session to the non-edge device is a grant of suspended security review, and wherein the non-transitory computer-readable medium further includes therein instructions that when executed by the processing resource cause the processing resource to:

set a termination point of the grant of suspended security review; and revoke the grant of suspended security review based at least in part on the termination point of the grant of suspended security review.

17. A non-transitory computer-readable medium, the non-transitory computer-readable medium having stored therein instructions that when executed by a processing resource of a non-edge device cause the processing resource to perform a method comprising:

receiving a first network traffic from an edge device, wherein the first network traffic is a first part of a network traffic session, wherein the edge device is closer to a location in a network where network traffic is introduced into the network than the non-edge device, and wherein a default operating mode of the edge device involves the edge device sending all network traffic traversing the edge device to the non-edge device for application of at least one security process to the network traffic;

applying the at least one security process to the first network traffic to yield a security result; and based at least in part on the security result, forwarding the first network traffic to a destination;

performing, by the non-edge device, a suspension of security review analysis on the network traffic session to yield a likelihood of the network traffic session involving future harmful behavior; and facilitate efficient processing of the network traffic session by selectively excluding at least a portion of the network traffic session from security review by the non-edge device by:

based on the likelihood of the network traffic session involving future harmful behavior being greater than or equal to a predetermined or configurable threshold, leaving the default operating mode in place; and based on the likelihood of the network traffic session involving future harmful behavior being below a predetermined or configurable threshold, overriding the default operating mode by communicating an indication to the edge device that the edge device is not required to transmit a second part of the network traffic session to a non-edge device for application of the at least one security process.

18. The non-transitory computer-readable medium of claim 17, wherein the non-edge device is a network security appliance, and wherein the edge device is a network router.

19. The non-transitory computer-readable medium of claim 17, wherein the indication that the edge device is not required to transmit a second part of the network traffic session to the non-edge device is a grant of suspended security review, and wherein communicating the grant of suspended security review includes communicating a termination point for the grant of suspended security review.

20. The non-transitory computer-readable medium of claim 17, wherein the indication that the edge device is not required to transmit a second part of the network traffic session to the non-edge device is a grant of suspended security review, and wherein the non-transitory computer-readable medium further includes therein instructions that when executed by the processing resource cause the processing resource to:

set a termination point of the grant of suspended security review; and revoke the grant of suspended security review based at least in part on the termination point of the grant of suspended security review.

* * * * *